United States Patent [19]

Krom

[11] Patent Number: 5,160,284
[45] Date of Patent: Nov. 3, 1992

[54] ANTI-TURNING DOUBLE-ENDED BOLT ASSEMBLY

[75] Inventor: Thomas J. Krom, Lebanon, Tenn.
[73] Assignee: Square D Company, Palatine, Ill.
[21] Appl. No.: 821,332
[22] Filed: Jan. 13, 1992
[51] Int. Cl.$^5$ ............................................. H01R 11/09
[52] U.S. Cl. ..................................... 439/797; 403/44; 411/389
[58] Field of Search ...................... 403/43, 44, 46, 388; 411/389; 439/796, 797

[56] References Cited

U.S. PATENT DOCUMENTS

| | | | |
|---|---|---|---|
| 2,425,935 | 8/1947 | Hayman | 411/389 X |
| 2,485,280 | 10/1949 | Grace | 403/44 X |
| 3,141,686 | 7/1964 | Smith et al. | 411/389 X |
| 4,270,019 | 5/1981 | Thye et al. | 439/796 X |
| 4,643,512 | 2/1987 | Prodel | 439/797 X |
| 4,786,201 | 11/1988 | Huetter et al. | 403/44 X |

*Primary Examiner*—Neil Abrams
*Assistant Examiner*—Khiem Nguyen
*Attorney, Agent, or Firm*—David Russell Stacey

[57] ABSTRACT

A clamping assembly which provides a uniform pressure simultaneously at two spaced apart points. The assembly includes a portion of a support member which has two parallel sides and a passage connecting the two parallel sides. A tubular shaped sleeve is received within the passage and includes short tabs extending slightly past the surface of the two parallel sides of the support member. A U-shaped anti-turn bracket is slidably received around the support member and includes slots that coincide with the passage in the support member. The tubular sleeve has a non-circular inside cross-section. A double-ended bolt having a first and second threaded end and an intermediate non-circular portion complementary to the non-circular cross-section of the sleeve is slidably received within the sleeve. The bolt is permitted to move linearly but not permitted to rotate within the sleeve. Threaded nuts are placed on each of the first and second threaded end. A uniform torque at both of the first and second ends can be obtained by tightening only one of the nuts without requiring the other nut to be held or tightened. This is accomplished by the ability of the bolt to slide linearly within the sleeve while being prevented from rotating.

5 Claims, 5 Drawing Sheets

ANTI-TURNING DOUBLE-ENDED BOLT ASSEMBLY

FIELD OF THE INVENTION

The invention generally relates to hardware employed in making bolted electrical connections and for attaching electrical conductors to mechanical supports, and in certain respects, the invention relates to a single threaded fastener having provisions for receiving a nut on both ends. The fastener applies a uniform clamping pressure at both ends while requiring a tool for applying that pressure at only one end.

BACKGROUND OF THE INVENTION

It is common practice in switchboard manufacturing to have internal bussing attached to electrically insulated support means. The use of multiple electrical conductors to carry the current of each electrical phase is also common practice in the industry. Confined working space inside the switchboard causes many problems during assembly, especially where bolted electrical connections are required. The confined spaces and close proximity of structural members and electrical conductors in a switchboard can make inserting a long bolt or torquing a bolted electrical connection extremely difficult, if not impossible. In many applications, the electrical conductors are assembled as a subassembly and installed into the switchboard as a single unit. This type of assembly may further inhibit working space and the ability to insert bolts for electrical connections. Double-ended bolts with provisions for anti-turning have been used in switchboard assemblies by the Square D Company, the assignee hereof, in the past. However, these bolts have required that the nuts placed on each end be torqued separately to give the proper torque on each side. This requires that sufficient space must be provided to attach, operate, and remove the tool used for torquing the nuts on both sides of the assembly. Further, these bolts were machined from rawstock having a much larger diameter than that of the bolt threaded diameter in order to provide a surface for the anti-turn feature. Because these bolts had a larger diameter to provide the anti-turn feature, they had to be installed in the support member prior to attaching the electrical conductors. This caused problems when installing a subassembly of electrical conductors. The cost of the large diameter rawstock and additional machining time involved made these bolts very expensive to manufacture.

SUMMARY OF THE INVENTION

It is an object of the present invention to provide a means for making a bolted electrical connection for attaching electrical conductors to a supporting member in areas where structural members or electrical conductors may limit or interfere with assembly tools. The present invention is specifically designed for applications where two or more electrical conductors of a common electrical phase are to be attached to, and spaced apart by, a supporting member having parallel sides at the point of attachment. The attachment is to be made by an assembly comprising a single bolt having threads at both ends, two nuts, a bolt sleeve, and an anti-turn bracket. The fastener assembly is designed such that the bolt, when inserted into the sleeve, can move linearly but cannot rotate within the sleeve. The anti-turn bracket interacts with the sleeve and the supporting member to prevent the sleeve from rotating and thereby preventing the bolt from rotating. This allows the assembler to tighten the connection to a specific torque on both sides of the supporting member at the same time by turning either one of the two nuts. The other nut does not have to be captivated or held by a tool to prevent it from rotating. Since there is no head on the bolt, it can be installed or removed from either side of the supporting member. It also permits electrical conductors to be installed on both sides of the supporting member before or after the bolt is inserted through the supporting member. This allows a subassembly of conductor to be easily installed prior to inserting the double-ended bolt. All of these features are extremely useful when access space is limited.

Other features and advantages of the invention will become apparent to those skilled in the art upon review of the following detailed description, claims and drawings.

Figure 1:
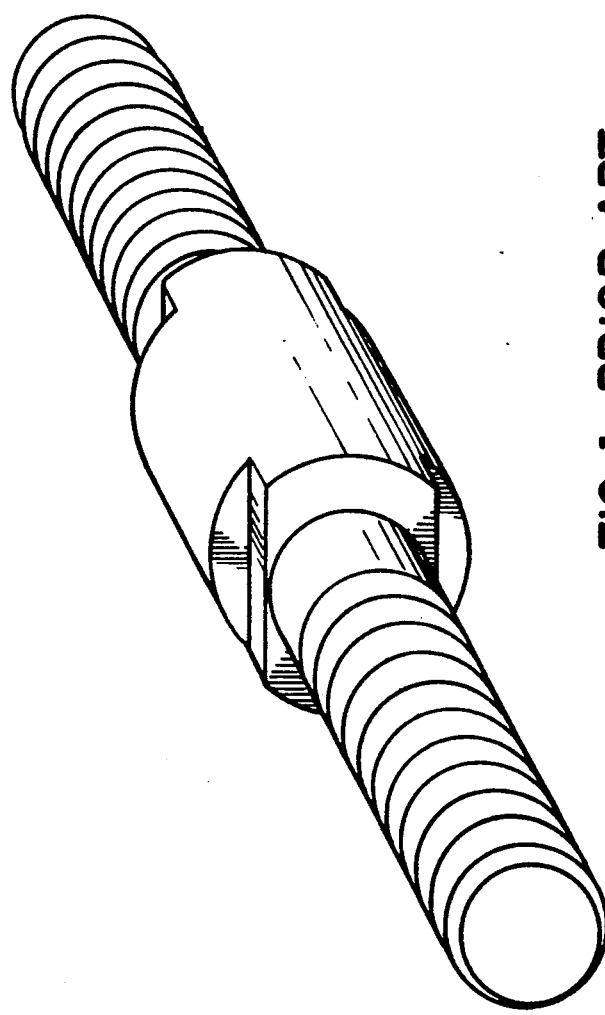
FIG. 1 is an isometric view of a prior art anti-turning double-ended bolt.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

Figure 2:
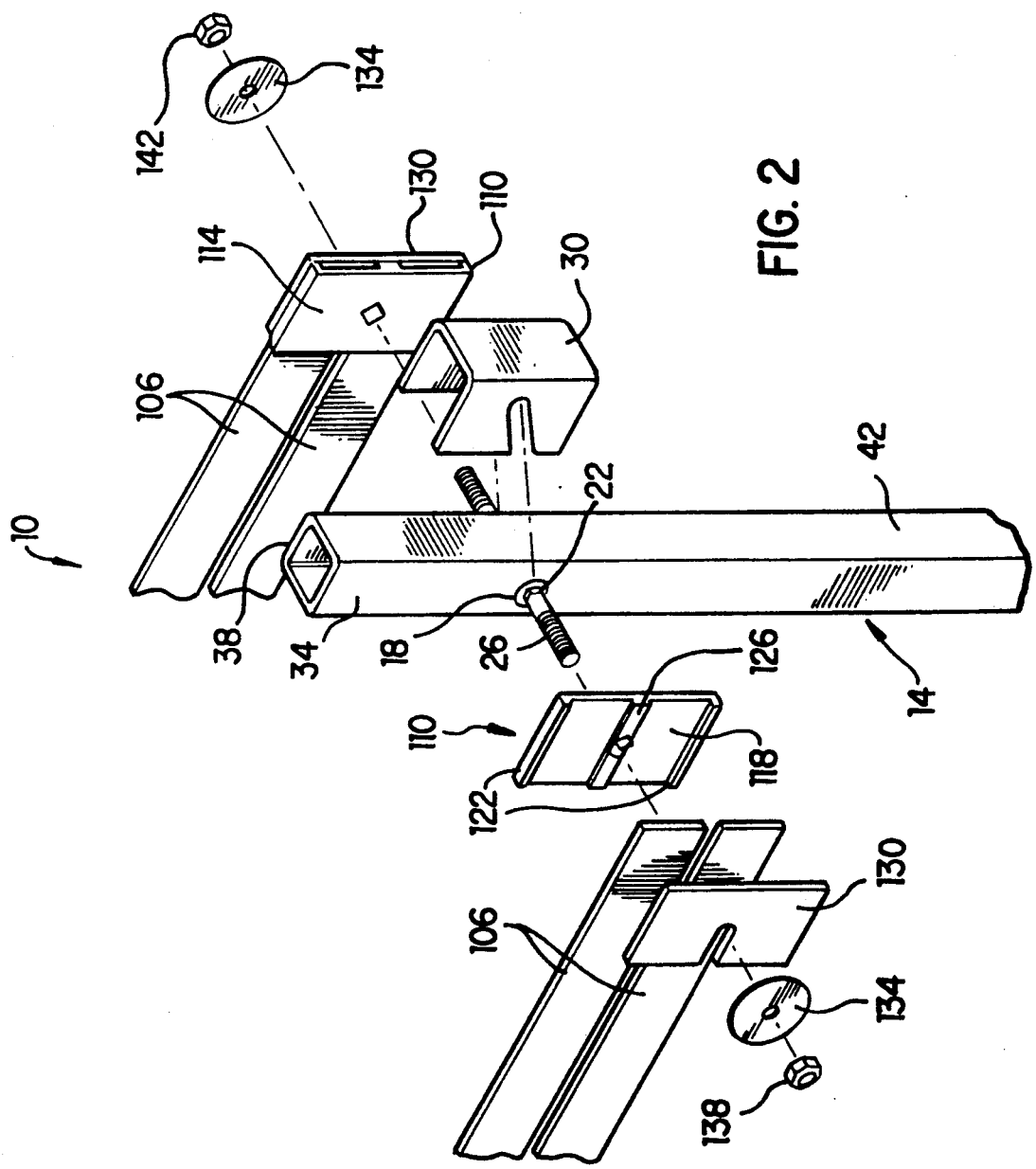
FIG. 2 is an exploded view of a multiple bus electrical conductor system incorporating an anti-turn double-ended bolt assembly, constructed in accordance with the present invention, for mounting to a support member.

The anti-turning double-ended bolt assembly of the present invention is generally shown as 10 in FIG. 2. The assembly includes a portion of support member 14 having a hole 18, a sleeve 22, a double-ended bolt 26, and an anti-turn bracket 30.

In the preferred embodiment, the support member 14 is made of an electrically insulating material and has at least two parallel sides 34 and 38 spaced apart by a web 42. The support member 14 can be hollow as shown or solid. The hole 18 defines a passage extending through and perpendicular to both parallel sides 34 and 38.

Figure 4:
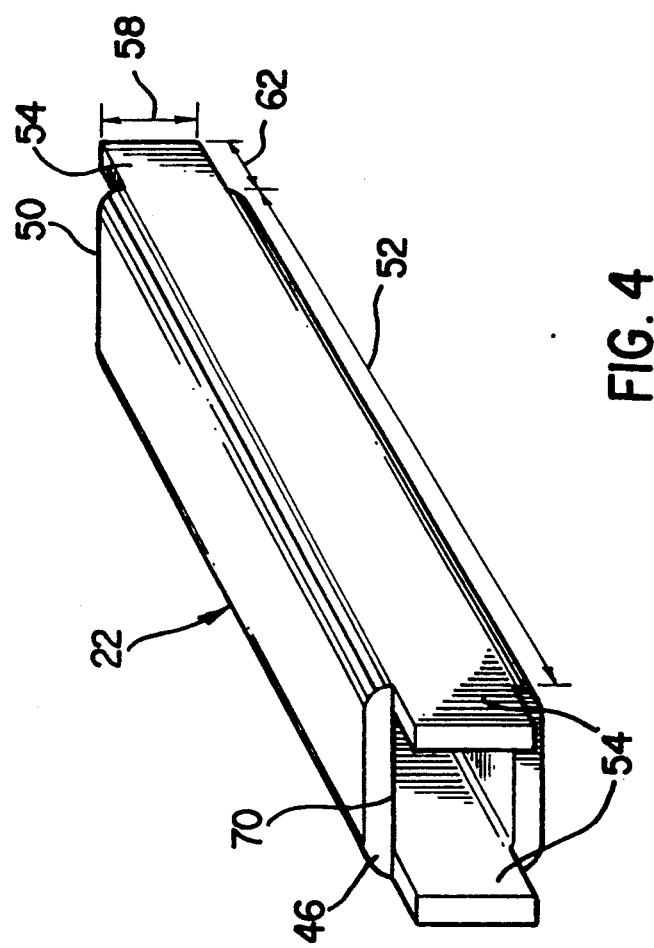
FIG. 4 is an isometric view of the sleeve according to the present invention.

Referring now to FIG. 4, the sleeve 22 is generally a hollow tube and is dimensioned to be slidably received in the hole 18 in the support member 14. The sleeve 22 includes a first end 46 and a second end 50 spaced apart by a length 52 not longer than the width of the web 42. The sleeve 22 has at least one rectangularly shaped tab 54 extending longitudinally from each end. The width 58 of the tab 54 is approximately equal to the major thread diameter of the double-ended bolt 26. The length 62 of the tab 54 is not longer than the thickness 66 of the anti-turn bracket 30. The sleeve 22 has a noncircular interior cross-sectional shape 70. The preferred cross-sectional shape as shown in this embodiment is square however any noncircular cross-sectional shape would be acceptable for the intended purpose.

Figure 3:
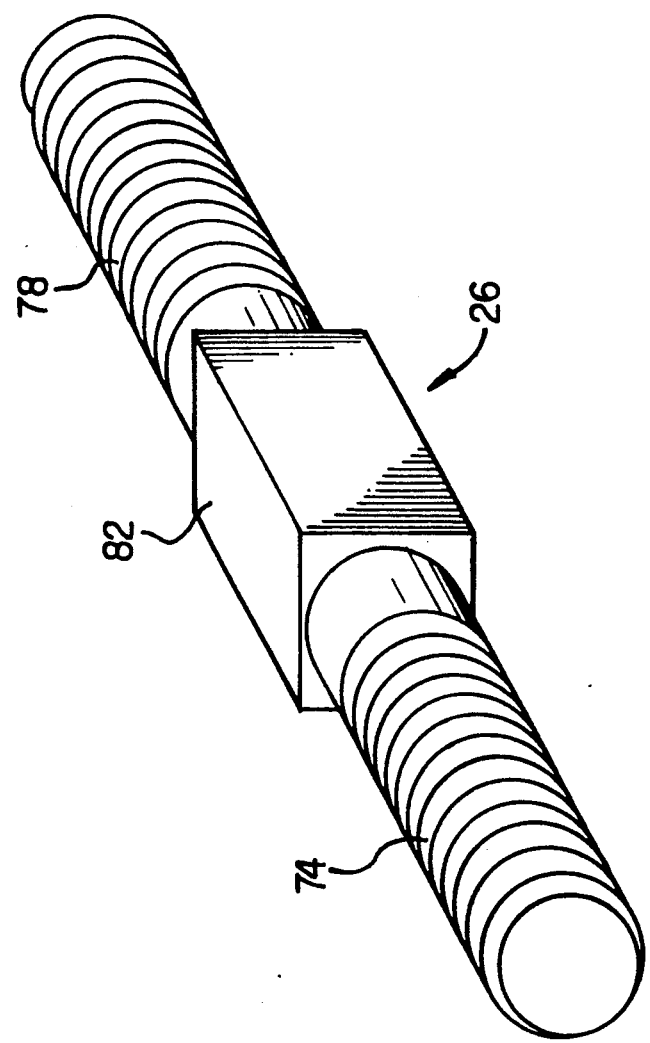
FIG. 3 is an isometric view of the double-ended bolt according to the present invention.

Referring now to FIG. 3, the double-ended bolt 26 includes a first threaded end 74, a second threaded end 78, and a noncircular portion 82 intermediate the first and second threaded ends 74 and 78 respectively. The noncircular portion 82 has a cross-section corresponding to the noncircular interior cross-section 70 of the sleeve 22 such that the noncircular portion 82 of the double-ended bolt 26 is slidably received within the noncircular interior 70 of the sleeve 22. The complimentary noncircular cross-sectional shapes of the portion 82 of the double-ended bolt 26 and the sleeve 22 prevent the bolt 26 from rotating within the sleeve 22.

Figure 5:
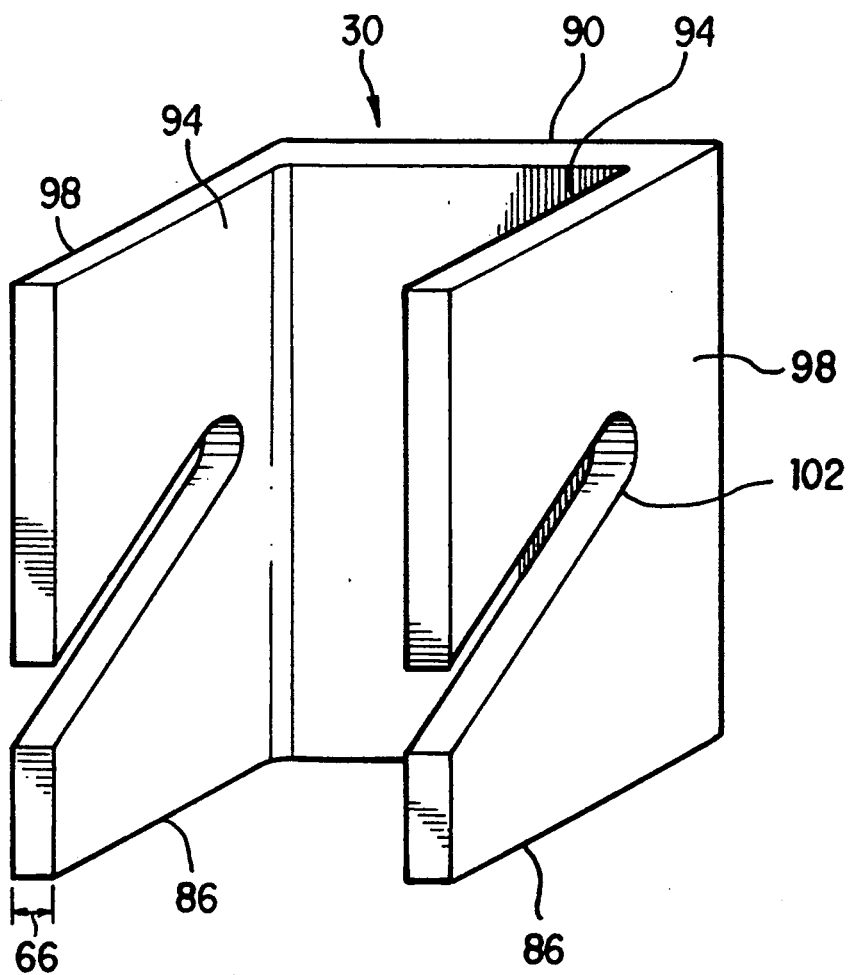
FIG. 5 is an isometric view of the anti-turn bracket according to the present invention.

Referring now to FIG. 5, the anti-turn bracket 30 is generally Ushaped, having two parallel sides 86 spaced apart by a web 90. Each of the sides 86 includes an inside surface 94 and an outside surface 98. The web 90 of the anti-turn bracket 30 is slightly wider than the web 42 of the support member 14 such that the inside surfaces 94 of the two parallel sides 86 are slidably received along the two parallel sides 34 and 38 of the support member 14 as shown in FIG. 2. Each of the two parallel sides 86 includes a slot 102 having dimensioned to slidably receive width 58 of the tabs 54 extending from the ends of the sleeve 22. The slots 102 engage the tabs 54 such that the sleeve 22 is prevented from rotating.

The slots 102 are positioned in sides 86 at an oblique angle such that the anti-turn bracket 30 must slide forward and downward with respect to the support member 14 as the slots 102 engage the tabs 54. As the slots 102 slidably engage the tabs 54, the web 90 of the anti-turn bracket 30 engages the web 42 of the support member 14 which prevents any rotational movement of the anti-turn bracket 30 with respect to the support member 14. The preferred oblique angle is about 30 degrees to the horizontal. However, any angle less than 90 degrees to the horizontal would permit the interlocking of the support member 14, anti-turn bracket 30 and the tabs 54. The anti-turn bracket 30 is preferably made of an electrically conductive material such as copper thereby electrically connecting electrical conductors 106 placed on either side of the support member 14. The conductors 106 are typically positioned against a conductor supporting plate 110 which is respectively positioned against the outside surface 98 of the anti-turn bracket 30. The supporting plate 110 is generally the same width as the conductor 106 and includes an inside surface 114, an outside surface 118, and a pair of parallel ribs 122 extending outwardly and perpendicularly to the outside surface 118 along the edge of the supporting plate 110. The ribs 122 extend outwardly a distance slightly less than the thickness of the conductor 106 and are spaced apart a distance slightly greater than the width of the conductor 106. If more than two conductors 106 are to be placed on each side of the support member 14, the conductor supporting plate 110 can have a third rib 126 which separates the conductors and holds them in place. The third rib 126 is also parallel to the ribs 122 and spaced apart from them a distance slightly greater than the width of the conductors 106. An outer plate 130 is usually placed against the outside surface of the conductors 106 for providing a means of clamping the conductors 106 against the supporting plate 110. A washer 134 can be placed against the outside surface of the outer plate 130. A first nut 138 is placed on one of the first or second threaded ends 74 and 78, respectively, of the double-ended bolt 26 and hand tightened. A second nut 142 is placed on the other of the first or second threaded ends 74 and 78, respectively, of the double-ended bolt 26 and hand tightened. Either one of the nuts 138 or 142 can then be torqued to a specific torque thereby applying a substantially equal force to both ends of the double-ended bolt 26. The other of the nuts 138 or 142 does not have to be held captive during the process of torquing since the double-ended bolt 26 is prevented from rotating by the sleeve 22. The ability of the double-ended bolt 26 to slide linearly within the sleeve 22 permits the applied force to be equal at both ends of the double-ended bolt 26.

An alternate assembly process involves assembling the electrical conductors 106 into a subassembly which is installed into the switchboard as a single unit. The ability to install the double-ended bolt 26 after the subassembly is in place eliminates many problems which would normally occur during such an assembly process.

In conclusion, therefore, it is seen that the present invention and the embodiments disclosed herein and those covered by the appended claims are well adapted to carry out the objectives and obtain the ends set forth. Certain changes can be made in the described and in the claimed subject matter without departing from the spirit and scope of this invention. It is realized that changes are possible within the scope of this invention and it is further intended that each element or step recited in any of the appended claims is to be understood as referring to all equivalent elements or steps. The following claims are intended to cover the invention as broadly as legally possible in whatever form its principles may be utilized.

What is claimed is:

1. A clamping assembly for providing a substantially uniform pressure simultaneously at two spaced apart locations for making two spaced apart electrical connections simultaneously, said clamping assembly comprising:
    a) a portion of a support member, said member having at least two spaced apart parallel sides including an intermediate web perpendicular to said parallel sides for connecting said parallel sides, said portion having a hole therethrough defining a passage through and generally perpendicular to said parallel sides;
    b) a tubular sleeve dimensioned to be slidably received in said passage of said support member and having a length not longer than the length of said passage, said sleeve having at least one generally rectangular tab extending longitudinally beyond each end of said sleeve, said tubular sleeve having a noncircular interior cross-sectional shape;
    c) an generally U-shaped anti-turn bracket comprising two parallel flanges spaced apart by an intermediate web, said bracket dimensioned for being slidably received over said parallel sides of said support member, said bracket including an elongated slot positioned in each of said flanges for receiving and engaging said tabs of said sleeve to prevent rotation of said sleeve;
    d) a bolt having a first threaded end, a second threaded end, and a noncircular portion intermediate said first and second threaded ends, said noncircular portion having a cross-sectional shape dimensioned for being closely received within said noncircular interior cross-sectional shape of said sleeve, said bolt further being slidably received within said sleeve such that linear movement is permitted and rotational movement is prohibited;

e) a first nut threadably received on said first threaded end of said bolt; and f) a second nut threadably received on said second threaded end of said bolt, whereby tightening either of said first or second nuts exerts a uniform pressure on both sides of said support member due to the linear movement of said bolt in said sleeve.

2. The assembly of claim 1 wherein said support member is made from an electrically insulating material.

3. The assembly of claim 2 wherein said anti-turn bracket is made from an electrically conductive material such that electrical conductors placed on one side of said support member are electrically connected to electrical conductors placed on the other side of said support member.

4. The assembly of claim 3 wherein said slots in said anti-turn bracket are at an angle such that engagement with said tabs of said sleeve will hold said anti-turn bracket snugly against said support member preventing any rotational movement of said anti-turn bracket with respect to said support member while also preventing any rotational movement of said sleeve with respect to said anti-turn bracket.

5. The assembly of claim 4 wherein said double-ended bolt can be slidably removed from said sleeve without removing said anti-turn bracket from said support member.

* * * * *